(12) United States Patent
Linzer

(10) Patent No.: US 7,502,513 B2
(45) Date of Patent: Mar. 10, 2009

(54) COMMERCIAL DETECTOR WITH A START OF ACTIVE VIDEO DETECTOR

(75) Inventor: Elliot N. Linzer, Suffern, NY (US)

(73) Assignee: LSI Corporation, Milpitas, CA (US)

( * ) Notice: Subject to any disclaimer, the term of this patent is extended or adjusted under 35 U.S.C. 154(b) by 767 days.

(21) Appl. No.: 10/713,441

(22) Filed: Nov. 14, 2003

(65) Prior Publication Data

US 2005/0108745 A1    May 19, 2005

(51) Int. Cl.
G06K 9/62 (2006.01)
G06K 9/34 (2006.01)
H04H 20/14 (2008.01)
H04H 60/32 (2008.01)
H04N 7/16 (2006.01)

(52) U.S. Cl. .................. 382/224; 382/173; 725/22; 725/19; 725/20

(58) Field of Classification Search ............ 382/173, 382/224; 725/19, 20, 36, 22
See application file for complete search history.

(56) References Cited

U.S. PATENT DOCUMENTS

| | | | |
|---|---|---|---|
| 5,119,082 A * | 6/1992 | Lumelsky et al. .......... 345/600 |
| 6,463,102 B1 * | 10/2002 | Linzer .................. 375/240.29 |
| 7,302,160 B1 * | 11/2007 | Wells ........................ 386/94 |
| 2003/0001977 A1 * | 1/2003 | Wang ....................... 348/700 |
| 2003/0117530 A1 * | 6/2003 | McGee et al. ............. 348/700 |
| 2003/0145320 A1 * | 7/2003 | Vogel ......................... 725/22 |
| 2003/0202773 A1 * | 10/2003 | Dow et al. ................... 386/46 |
| 2004/0114049 A1 * | 6/2004 | Arora ....................... 348/445 |
| 2004/0161154 A1 * | 8/2004 | Hua et al. .................. 382/229 |
| 2005/0010944 A1 * | 1/2005 | Wright et al. ............... 725/22 |
| 2005/0128361 A1 * | 6/2005 | Li et al. .................... 348/701 |

FOREIGN PATENT DOCUMENTS

JP    11136634 A   *   5/1999

* cited by examiner

*Primary Examiner*—Jingge Wu
*Assistant Examiner*—Bernard Krasnic
(74) *Attorney, Agent, or Firm*—Christopher P. Maiorana, PC

(57) ABSTRACT

A method for classifying a first video type and a second video type in a digital video signal having a series of frames is disclosed. The method generally includes a first step of (A) reading a first set of parameters defining an active portion of a first of the frames. A second step may involve (B) reading a second set of parameters defining an active portion of a second of the frames. A third step includes (C) comparing the first set of the parameters with the second set of parameters to generate a comparison value. As such, (D) if the comparison value is above a predetermined threshold, indicating the first video type and (E) if the comparison value is not above the predetermined value, indicating the second video type.

21 Claims, 6 Drawing Sheets

COMMERCIAL DETECTOR WITH A START OF ACTIVE VIDEO DETECTOR

FIELD OF THE INVENTION

The present invention relates to video generally and, more particularly, to a commercial detector with a start of active video detector.

BACKGROUND OF THE INVENTION

Conventional video recording devices, such as video cassette recorders (VCRs), recordable DVD drives, and hard-disk based recorders, often contain a feature to detect commercial advertisements. A user often has the option to skip the detected commercials when playing back a recording.

Conventional approaches used to determine what is or is not a commercial look at characteristics of the video sequences to classify the material as part of a main program or part of a commercial. Conventional methods include using average DC values or motion vectors to determine transitions between the program and the commercials.

SUMMARY OF THE INVENTION

The present invention concerns a method for classifying a first video type and a second video type in a video signal having a series of frames, comprising the steps of (A) reading a first set of parameters defining an active portion of a first of the frames, (B) reading a second set of parameters defining an active portion of a second of the frames, (C) comparing the first set of parameters with the second set of parameters to generate a comparison value, (D) if the comparison value is above a predetermined threshold, indicating the first video type and (E) if the comparison value is not above the predetermined value, indicating the second video type.

The objects, features and advantages of the present invention include providing a commercial detector with an active estimator that may (i) estimate the start of an active video in a sequence, (ii) classify different parts of a video sequence to determine the location of programs distinguished from commercials and/or (iii) be used to skip commercials during playback.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
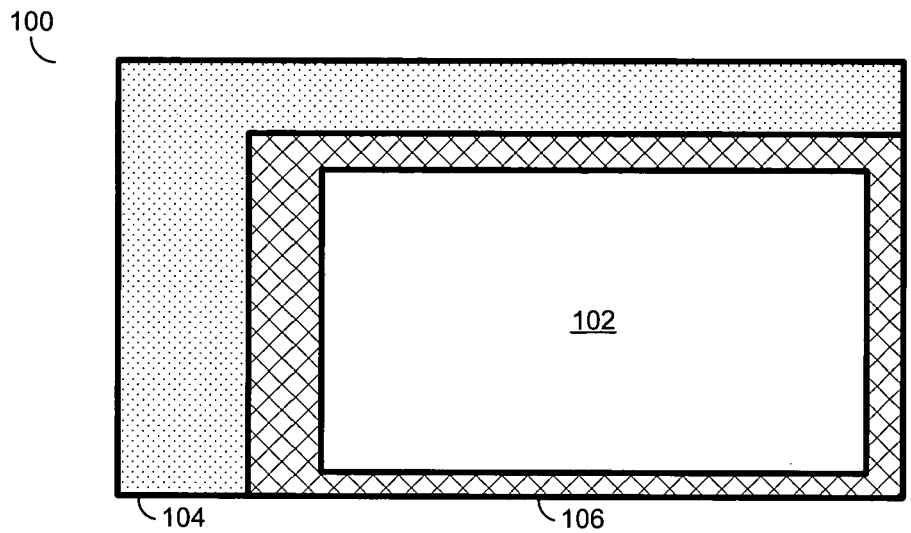
FIG. 1 illustrates various portions of a video frame.
Figure 1:
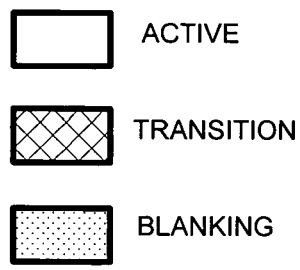

Referring to FIG. 1, a frame 100 of a video signal is shown. In a video signal (such as a digital video signal), a number of frames are presented consecutively to a display device. The frame 100 generally comprises an active video portion 102, a blank video portion (or region) 104 and a transition video portion (or region) 106. The active video portion (or region) 102 is the part of the frame 100 that contains the picture that is displayed. The blank video portion 104 does not contain any video. The blank video portion is typically solid black, but may also hold non-video data (e.g., embedded audio, etc.). The blank video portion 104 is generally presented in the overscan of a display device and is not normally viewable. The transition video portion 106 may contain either active video or may be blank. The size of the active portion 102 may expand or contract within the transition video portion 106. A high definition video signal (e.g., 1080i, 720p, etc.) may be presented in a 16×9 format. During network broadcasts, commercials typically are presented in a 4×3 format. The different aspect ratios change within the active video portion 102. Changes within the transition video portion also occur, but within the portion of the frame 100 presented in the overscan portion of a display device.

In a CCIR signal, the active portion 102 and the transition portion 106 (which may be referred to as the nominally active region) is 720 pixels wide × 486 pixels high. The active portion 102 of the video signal is in a somewhat smaller region (e.g., 700×475). Typically, up to 12 columns on the left and/or right side and up to 3-4 lines on the top and/or bottom may be black.

Figure 2:
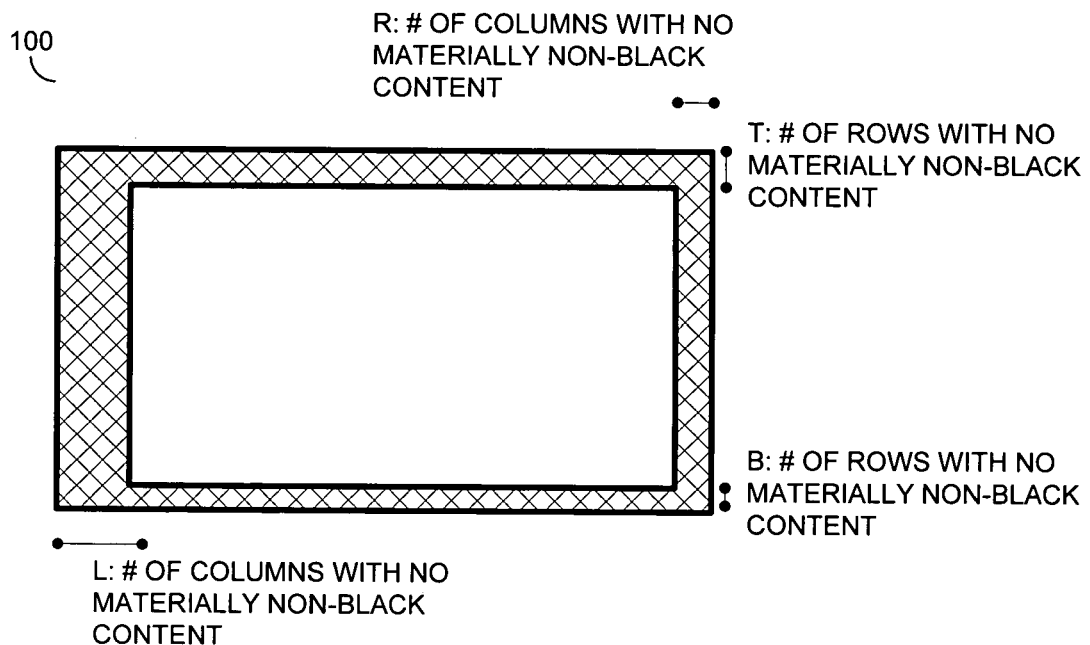
FIG. 2 illustrates an example of parameters defined in a frame that are used for commercial detection.

Referring to FIG. 2, a diagram of a frame 100 illustrating definition of a set of four parameters (herein referred to as a 4-set) that may be used for signal detection. In one example, the 4-set may be implemented as a true active detector. The true active detector may be used to detect the region that comprises the inactive part of the nominally active area 102. This may be expressed as a 4-set (T, B, L, R), where:

T is the number of lines from the top of the nominally active area to the active area 102 that comprise video with no materially non-black content, B is the number of lines from the bottom of the nominally active area to the active area 102 that comprise video with no materially non-black content, L is the number of lines columns the left of the nominally active area to the active area 102 that comprise video with no materially non-black content, and R is the number of lines columns the right of the nominally active area to the active area that comprise video with no materially non-black content.

Figure 3:
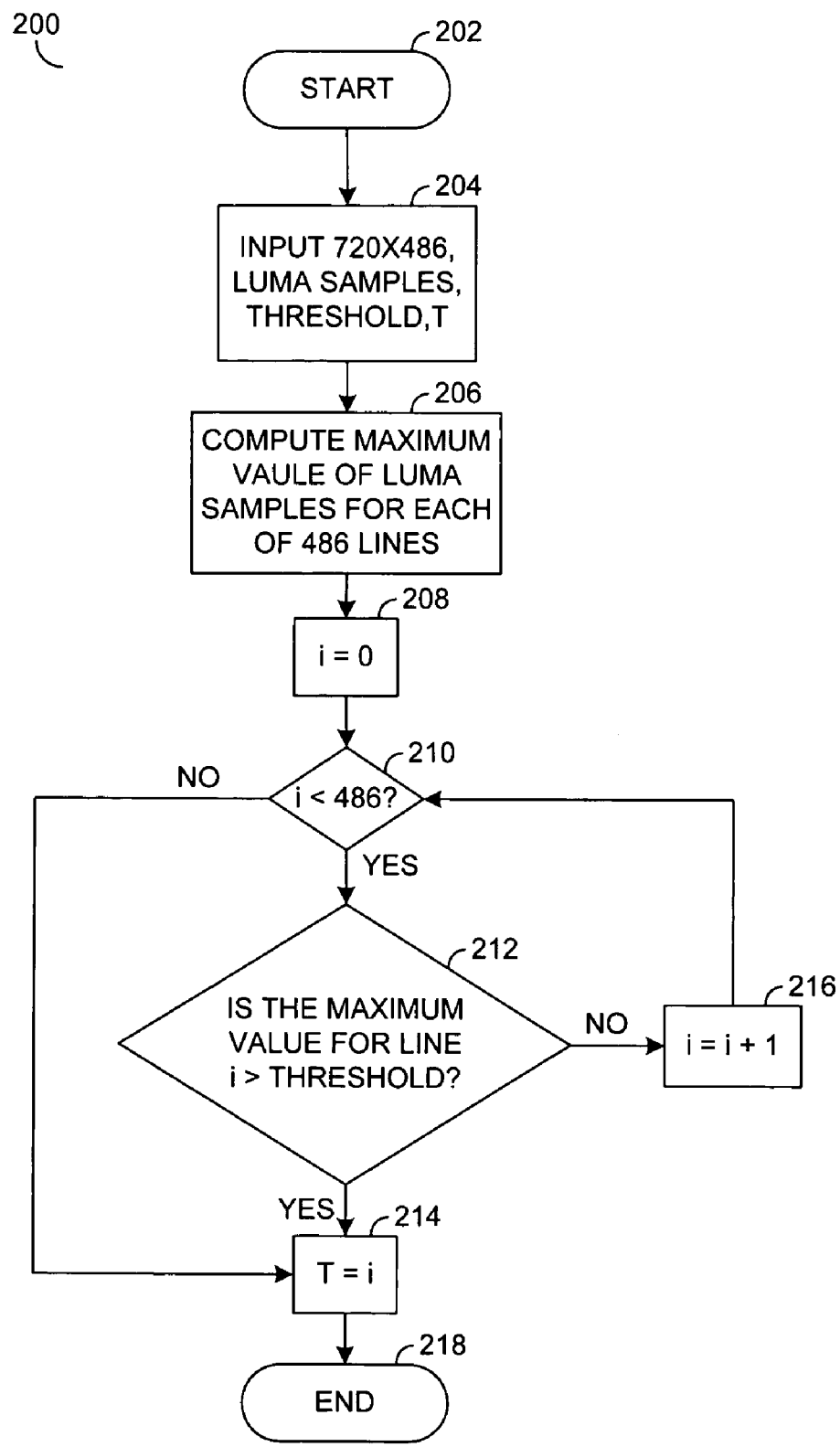
FIG. 3 is a flow diagram of a portion of a preferred embodiment of the present invention used for a first calculation.

Referring to FIG. 3, a flow diagram illustrating a method (or process) 200 is shown in accordance with a preferred embodiment of the present invention. The method 200 may be used to compute the number of lines T from (i) the luma samples and (ii) a threshold value (e.g., TH). In one example, the value of the threshold TH may be set to 18 (assuming that luma samples are represented using 8 bits). However, other values of the threshold TH may be used to meet the design criteria of a particular implementation.

The method 200 generally comprises a state 202, a state 204, a state 206, a state 208, a decision state 210, a decision state 212, a state 214, a state 216 and a state 218. The state 202 generally begins the process 200. The state 204 initializes an input. In one example, the input may be a 720×486 frame, luma samples for the frame, the threshold TH and the number of lines T. Next, the state 206 computes the maximum value of the luma samples for each of the 486 lines. Next, the state 208 initializes a variable i (e.g., the particular line number) to be zero. Next, the decision state 210 determines whether the line number i is less than 486. If so, the method 200 moves to the state 212. If not, the method 200 moves to the state 214. The decision state 212 determines if a maximum value of the luma samples for the line number i is greater than the threshold TH. If so, the method 200 moves to the state 214. If not, the method 200 moves to the state 216. The state 216 increments the line number i by 1 (e.g., i=i+1) and returns to the state 210. The state 214 sets the number of lines T to i. Next, the state 218 ends the method 200.

Figure 4:
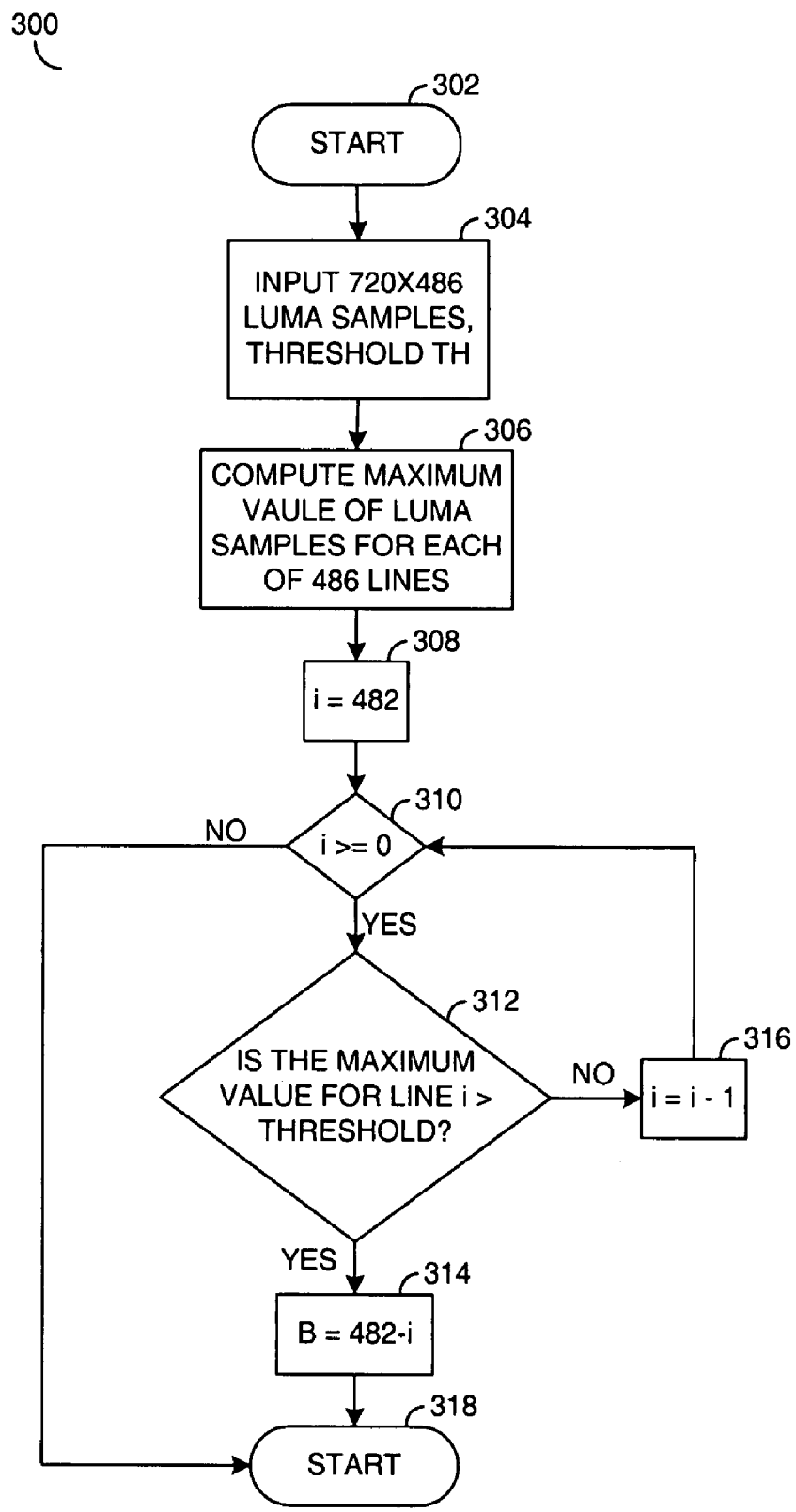
FIG. 4 is a flow diagram of a portion of a preferred embodiment of the present invention used for a second calculation.

The variable i is the line number. For example, for a frame having lines 0, 1, etc. with maximum luma values 16, 16, 16, 16, 17, 20, 22 etc. and threshold TH=18, the method is generally implemented as follows:

(208) i=0
(210) Yes
(212) max value for line i=0 is 16. No
(216) i=1
(210) Yes
(212) max value for line i=1 is 16. No
(216) i=2
(210) Yes
(212) max value for line i=2 is 16. No
(216) i=3
(210) Yes
(212) max value for line i=3 is 16. No
(216) i=4
(210) Yes
(212) max value for line i=4 is 17. No
(216) i=5
(210) Yes
(212) max value for line i=5 is 20. Yes
(214) T=5
(218) End Referring to FIG. 4, a flow diagram illustrating a method (or process) 300 for computing the number of lines B is shown. The method 300 is similar to the method 200. The method 300 generally comprises a state 302, a state 304, a state 306, a state 308, a decision state 310, a decision state 312, a state 314, a state 316 and a state 318. The state 302 generally begins the process 300. The state 304 initializes an input. In one example, the input may be 720×486 luma samples and the threshold TH. Next, the state 306 computes the maximum value of luma samples for each of the 486 lines. Next, the state 308 initializes the line number i to be 482. Next, the decision state 310 determines whether the line number i is greater than or equal to zero. If so, the method 300 moves to the state 312. If not, the method 300 moves to the state 314. The decision state 312 determines if a maximum value for the luma samples of the line number i is greater than the threshold TH. If so, the method moves to the state 314. If not, the method moves to the state 316. The state 316 decrements the line number i (e.g., i=i−1) and moves to the state 310. The state 314 sets the number of lines B to 482-i. Next, the state 318 ends the method 300. Methods similar to the method 200 and the method 300 may be used to compute the number of lines (or columns) L and R.

The method 200 and the method 300 may be implemented to compute a luma-derived 4-set (TL, BL, LL, RL). A Cb-derived 4-set (TB, BB, LB, RB) may also be derived using similar methods with Cb chroma component values of the frame. Instead of checking if a Cb sample is greater than the threshold TH, a check of the absolute value of the chroma sample minus 128 is greater than the threshold TH may be made. The reason for the difference is that a black pixel normally has Cb and Cr values of 128. Similarly, a computation of a Cr derived 4-set (TR, BR, LR, RR) is also made. The 4-sets may be combined to get a 4-set that uses all three components. In particular:

T=min(TL, TB, TR)
B=min(BL, BB, BR)
L=min(LL, LB, LR)
R=min(RL, RB, RR)

Using all three components may be somewhat more robust than using only the luma component. A trade off between expense and robustness may be used to obtain a desirable trade off.

The method 200 and the method 300 may be used for program and commercial estimation may be determined by (i) determining unbroken segments, (ii) detecting commercial signatures, (iii) performing a program return and/or (iv) determining similar 4-sets. Determining unbroken segments may be performed by comparing the 4-set (T, B, L, R) of different frames. If the 4-set remains fairly constant over a sequence of frames, the sequence constitutes an unbroken segment. Unbroken segments, possibly along with other statistics may be used to break a long sequence into multiple segments which are presumed to belong to the same program or commercial.

Once an unbroken segment is determined, the unbroken segment is represented by a 4-set (T, B, L, R). In the preferred embodiment, each element of the 4-set is the minimum of the corresponding element of all of the 4-sets in the segment.

The 4-set (T, B, L, R), possibly in addition to other statistics, may be used to create a signature of a known commercial. If the same commercial is re-broadcast, the sequence can be detected as a commercial. The 4-set signature may be generated for both programs and commercials. The 4-set signature for a program is generally the same before and after a commercial.

Therefore, unlike convention methods, the present invention may be used to detect a signature for a program that will remain substantially constant in different scenes in the program. The signature for a program will also remain substantially constant from before a commercial break to after a commercial break. Therefore, the present invention may be used not only to determine transitions between different types of content, but may be used to determine whether a new scene is part of a commercial or is part of a return to a program before the commercial interruption.

Figure 5:
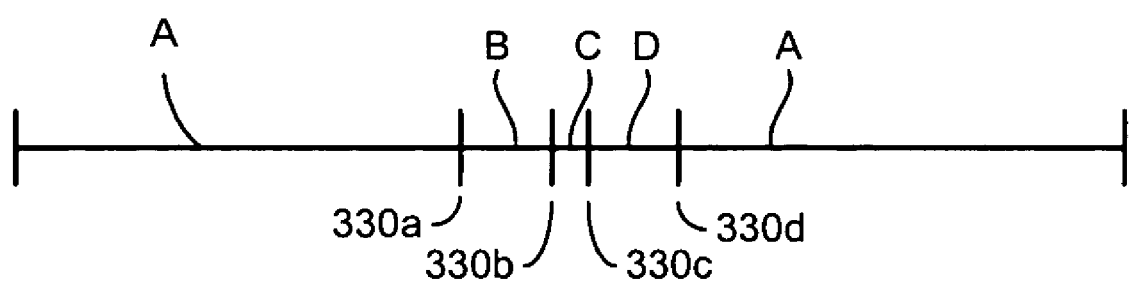
FIG. 5 is a diagram illustrating various unbroken segments in a video signal.

Referring to FIG. 5, a video sequence 320 comparison of a number of 4-sets (T, B, L, R) on a number of frames is shown. The comparison is used to indicate a return to a program. Five unbroken segments are shown, with 4-sets A, B, C, D and A. A number of transitions 330*a*-330*d* indicate a change from one 4-set (e.g., A) to another 4-set (e.g., B). The video sequence 320 starts at a segment A, having a first 4-set. After the transition 330*a*, the video sequence 320 changes to the segment B. After the transition 320*b*, the video sequence 320 changes to the segment C. After the transition 330*c*, the video sequence 320 changes to the segment D. The segments B, C, and D are classified as commercials (or an otherwise undesirable portion of the video signal). The space between each of the transitions 330*a*-330*d* represents an unbroken segment. For example, between the transition 330*a* and the transition 330*b*, each frame has the 4-set B.

The transitions 330*a*-330*d* are determined by analyzing whether or not two adjacent frames have a similar 4-set. For example, let (T0, B0, L0, R0) and (T1, B1, L1, R1) be the 4-sets for two consecutive frames. The 4-sets are similar if:

$$|T0-T1|+|B0-B1|+|L0-L1|+|R0-R1|<\text{threshold}$$

Typically, a larger threshold (e.g., 6) may be used to determine if a particular frame is part of an unbroken segment. A smaller threshold (e.g., 3) may be used to determine if two segments have the same 4-set.

Unlike conventional methods, the present invention may rely on statistics that depend mainly on how a program or commercial is produced, not the actual content. The start of active video statistics will remain nearly constant even as the content changes (e.g., a scene change in given program).

Figure 6:
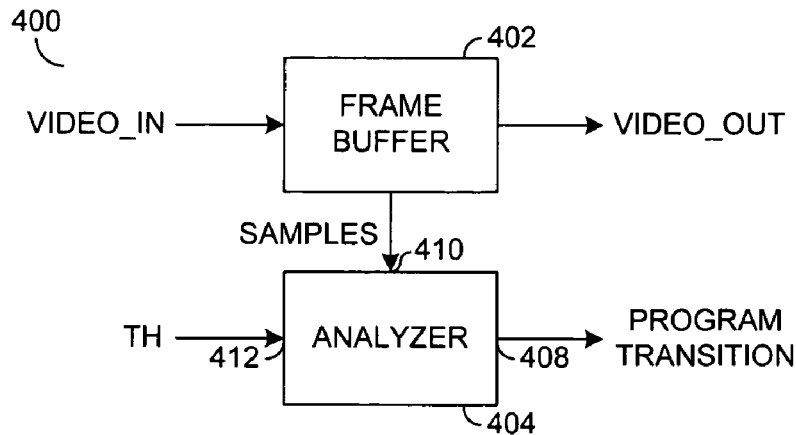
FIG. 6 is a block diagram illustrating an implementation of the present invention.

Referring to FIG. 6, a block diagram of a circuit 400 illustrating an implementation of the present invention is shown. The circuit 400 generally comprises a frame buffer 402 and an analyzer 404. The frame buffer 402 generally presents an output signal (e.g., VIDEO_OUT) in response to an input signal (e.g., VIDEO_IN). The frame buffer generally presents a signal (e.g., SAMPLES) to the analyzer 404. The signal SAMPLES generally comprises luma and/or chroma components of the signal VIDEO_IN. The analyzer circuit 404 has an output 408 that presents a signal (e.g., PROGRAM_TRANSITION) in response to the signal SAMPLES received at an input 410 and the signal TH received at an input 412.

Figure 7:
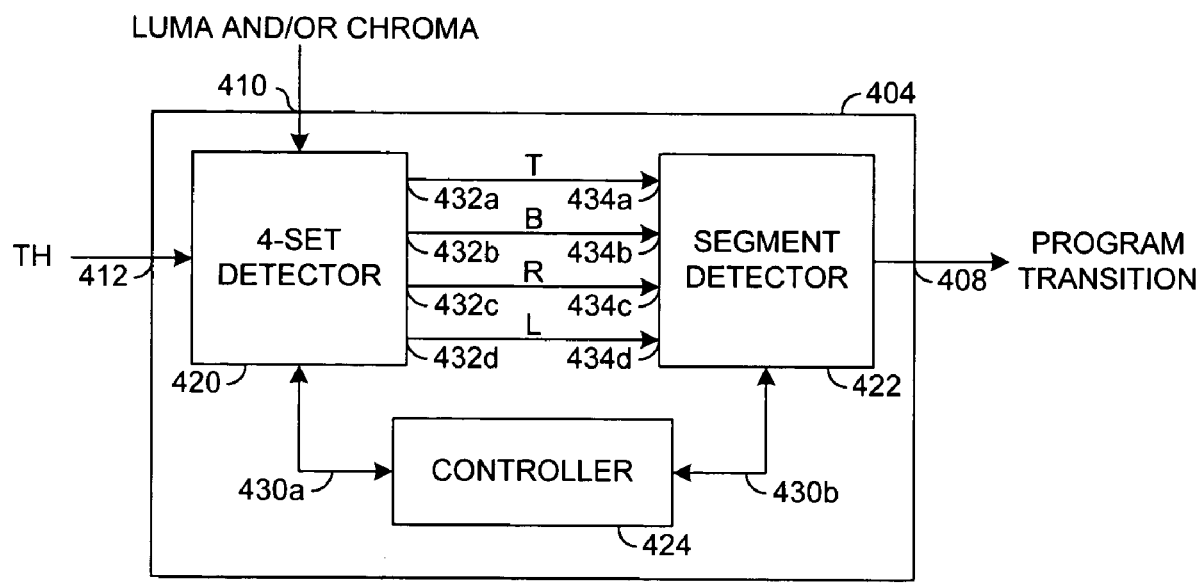
FIG. 7 is a more detailed block diagram of the analyzer of FIG. 6.

Referring to FIG. 7, a more detailed diagram of analyzer 404 is shown. The analyzer 404 generally comprises a block (or circuit) 420, a block (or circuit) 422 and a block (or circuit) 424. The circuit 420 may be implemented as a 4-set detector. The circuit 422 may be implemented as a segment detector. The circuit 424 may be implemented as a controller. The controller 424 bi-directionally communicates with the 4-set detector 420 and the segment detector 422 through a bus 430a and a bus 430b. The 4-set detector 420 has a number of outputs 432a-432d that present the 4-set values T, B, R and L to the number of inputs 434a-434d of the segment detector 422.

Figure 8:
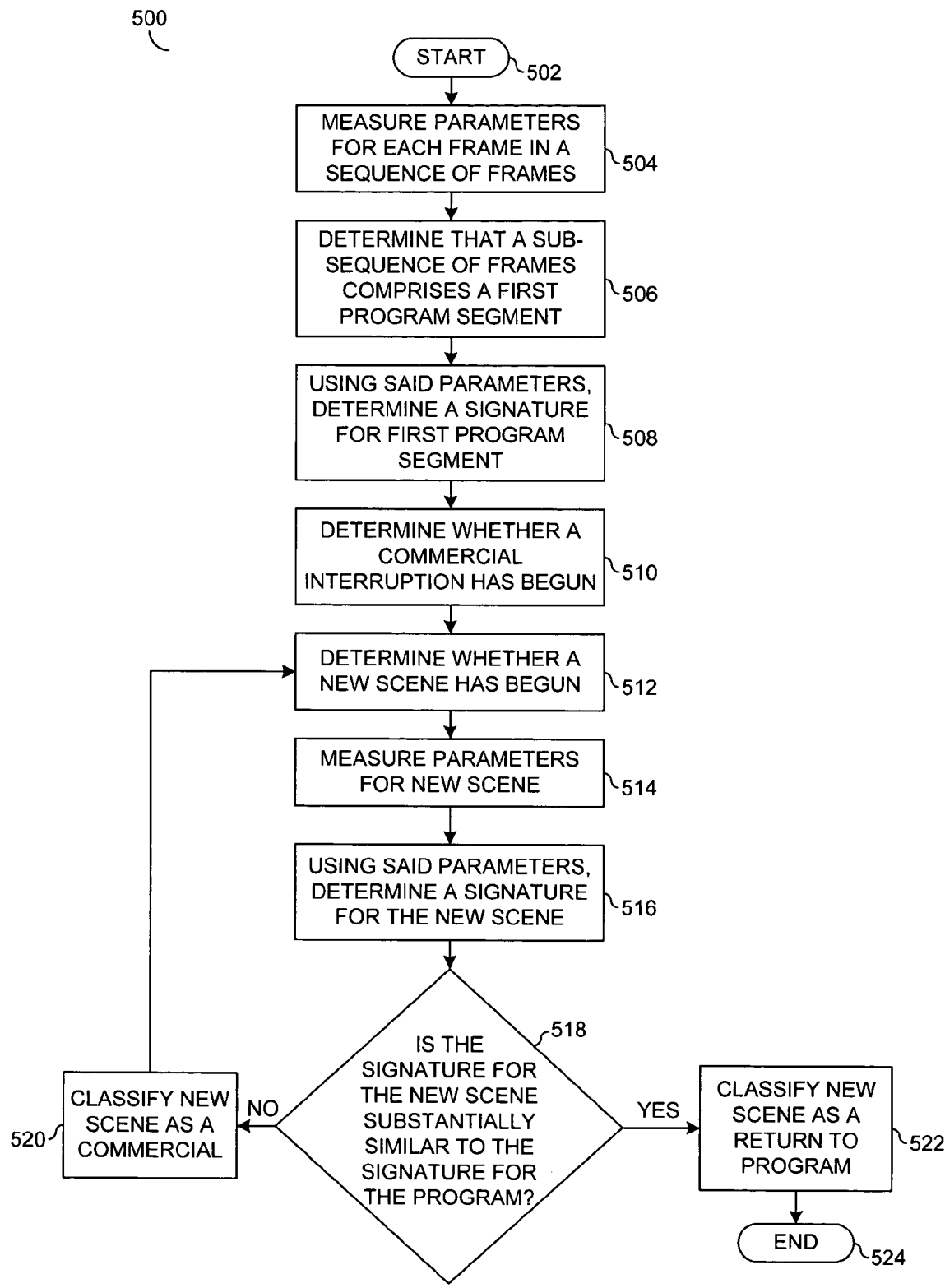
FIG. 8 is a flow diagram illustrating an implementation for segmenting a video signal into program and commercial segments.

Referring to FIG. 8, a flow diagram of a method (or process) 500 is shown in accordance with the present invention. The method 500 illustrates an implementation for segmenting a video signal into program and commercial segments. The method 500 generally comprises a start state 502, a state 504, a state 506, a state 508, a state 510, a state 512, a state 514, a state 516, a decision state 518, a state 520, a state 522 and a state 524. The state 504 may measure the parameters for each frame in the sequence of frames. Next, the state 506 may determine that a particular sub-sequence of frames comprises a first program segment. Next, the state 508 may use the parameters determined in the state 506 to determine a signature for a first program segment. Next, the state 510 determines whether a commercial interruption has begun. Next, the state 512 determines whether a new scene has begun. Next, the state 514 measures the parameters for the new scene. Next, the state 516 uses the parameters from the state 514 to determine a signature for the new scene. Next, the state 518 determines if the signature for the new scene is substantially similar to the signature for the program. If so, the method moves to the state 522. If not, the method moves to the state 520. The state 520 classifies the new scene as a commercial and then the method moves back to the state 512. If the state 518 determines that the signature for the new scene is substantially similar to the signature for the program, then the method moves to the state 522. The state 522 classifies the new scene as a return to program. The state 522 ends the method 500.

While the invention has been particularly shown and described with reference to the preferred embodiments thereof, it will be understood by those skilled in the art that various changes in form and details may be made without departing from the spirit and scope of the invention.

The invention claimed is:

1. A method for classifying a first video type and a second video type in one video signal, comprising the steps of:
   (A) buffering said video signal in a buffer, said video signal carrying a content comprising a sequence of frames;
   (B) reading a first of said frames from said buffer directly to an analyzer;
   (C) reading a second of said frames from said buffer directly to said analyzer;
   (D) generating in said analyzer a plurality of first parameters defining a first transition portion between a first active portion and a first blank portion in said first frame;
   (E) generating in said analyzer a plurality of second parameters defining a second transition portion between a second active portion and a second blank portion in said second frame, wherein said second frame follows said first frame in said content by a fixed temporal distance;
   (F) comparing said first parameters with said second parameters to generate a comparison value; and
   (G) generating a signal indicating (i) said first video type when said comparison value is greater than a predetermined threshold and (ii) said second video type when said comparison value is less than said predetermined threshold, wherein said predetermined threshold determines if said first frame and said second frame are part of an unbroken segment in said content.

2. The method according to claim 1, wherein (i) said first video type comprises a commercial in said content and (ii) said second video type comprises a program in said content.

3. The method according to claim 1, wherein said first parameters comprise (i) a first T parameter that represents a first number of top lines in said first transition portion, (ii) a first B parameter that represents a first number of bottom lines in said first transition portion, (iii) a first L parameter that represents a first number of left columns in said first transition portion, and (iv) a first R parameter that represents a first number of right columns in said first transition portion.

4. The method according to claim 1, wherein said first transition portion comprises a plurality of pixels with no materially non-black content.

5. The method according to claim 3, wherein said second parameters comprise (i) a second T parameter that represents a second number of top lines in said second transition portion, (ii) a second B parameter that represents a second number of bottom lines in said second transition portion, (iii) a second L parameter that represents a second number of left columns in said second transition portion and (iv) a second R parameter that represents a second number of right columns in said second transition portion.

6. The method according to claim 1, wherein said second transition portion comprises a plurality of pixels with no materially non-black content.

7. The method according to claim 5, wherein step (G) comprises comparing (a) a sum of (i) a first absolute value of a first difference between said first T parameter and said second T parameter plus (ii) a second absolute value of a second difference between said first B parameter and said second B parameter plus (iii) a third absolute value of a third difference between said first L parameter and said second L parameter plus (iv) a fourth absolute value of a fourth difference between said first R parameter and said second R parameter with (b) said predetermined threshold.

8. The method according to claim 1, wherein said video signal comprises a digital video signal.

9. An apparatus comprising:
a buffer configured to buffer one video signal, said video signal carrying a context comprising a sequence of frames;
a first detector circuit configured to (A) read a first of said frames directly from said buffer, (B) read a second of said frames directly from said buffer and (C) generate (i) a plurality of first parameters defining a first transition portion between a first active portion and a first blank portion in said first frame and (ii) a plurality of second parameters defining a second transition portion between a second active portion and a second blank portion in said second frame, wherein said second frame follows said first frame in said content by a fixed temporal distance;
a second detector circuit configured to (i) generate a comparison value by comparing said first parameters with said second parameters and (ii) generate a signal indicating (a) a first video type when said comparison value is greater than a predetermined threshold and (b) a second video type when said comparison value is less than said predetermined threshold; and
a controller (i) connected bidirectionally between said first detector circuit and said second detector circuit and (ii) configured to control said first detector circuit and said second detector circuit.

10. The apparatus according to claim 9, wherein said first detector circuit comprises a 4-set detector configured to detect at least four parameters from each of said frames.

11. The apparatus according to claim 9, wherein said second detector circuit comprises a segment detector configured to receive said second parameters following receipt of said first parameters.

12. The apparatus according to claim 9, wherein said first detector circuit generates said first parameters and said second parameters in response to (i) a threshold signal and (ii) one or more samples from said frames.

13. The apparatus according to claim 9, wherein a change in said signal indicates a transition between a first program type in said content and a second program type in said content.

14. A method for distinguishing between a commercial and a program in one digital video signal, comprising the steps of:
(A) buffering said digital video signal in a buffer, said digital video signal carrying a content comprising a sequence of frames;
(B) reading a first of said frames from said buffer directly to an analyzer;
(C) reading a second of said frames from said buffer directly to said analyzer;
(D) determining in said analyzer both a first size and a first position of a first truly active region in said first frame;
(E) determining in said analyzer both a second size and a second position of a second truly active region in said second frame, wherein said second frame follows said first frame in said content by a fixed temporal distance; and
(F) generating a signal to indicate (i) a lack of a scene transition between said commercial in said content and said program in said content when both said first size and said first position of said first truly active region are substantially similar to both said second size and said second position of said second truly active region and (ii) a presence of said scene transition between said commercial and said program when at least one of said first size and said first position of said first truly active region is not substantially similar to a corresponding at least one of said second size and said second position of said second truly active region.

15. The method according to claim 14, further comprising the steps of:
generating a first segment signature associated with said first frame where said scene transition represents a change from said program in said content to said commercial in said content; and
generating a second segment signature associated with said second frame.

16. The method according to claim 15, wherein said method further comprises implementing a commercial advance by:
skipping said frames having said second segment signature; and
returning from said commercial advance when said frames have said first segment signature.

17. A method for segmenting one video signal, comprising the steps of:
(A) buffering said video signal in a buffer, said video signal carrying a content comprising a plurality of program segments and a plurality of commercial segments;
(B) reading a first segment of said video signal from said buffer directly to an analyzer;
(C) generating in said analyzer a plurality of first parameters defining a first signature of said first segment independent of said content of said first segment;
(D) detecting an end of said first segment;
(E) reading a second segment of said video signal from said buffer directly to said analyzer;
(F) generating in said analyzer a plurality of second parameters defining a second signature of said second segment;
(G) comparing said second parameters to said first parameters; and
(H) classifying said second segment as a particular one of said program segments where said first parameters and said second parameters are substantially similar and said first segment comprises said particular program segment.

18. The method of claim 17, wherein said second parameters indicate a return to said particular program segment at the end of one of said commercial segments.

19. The method according to claim 17, further comprising the step of:
determining that said first segment comprises said particular program segment prior to step (D).

20. The method according to claim 17, further comprising the step of:
classifying said second segment as one of said commercial segments where said first parameters and said second parameters are not substantially similar.

21. The method according to claim 20, further comprising the step of:
determining whether a new scene has begun after classifying said second segment as said one of said commercial segments.

* * * * *